(12) United States Patent
Wakiyama et al.

(10) Patent No.: US 8,495,759 B2
(45) Date of Patent: Jul. 23, 2013

(54) PROBE ALIGNING METHOD FOR PROBE MICROSCOPE AND PROBE MICROSCOPE OPERATED BY THE SAME

(75) Inventors: Shigeru Wakiyama, Chiba (JP); Hiroyoshi Yamamoto, Chiba (JP); Yoshiteru Shikakura, Chiba (JP); Itaru Kitajima, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 99 days.

(21) Appl. No.: 12/510,794

(22) Filed: Jul. 28, 2009

(65) Prior Publication Data

US 2010/0031402 A1 Feb. 4, 2010

(30) Foreign Application Priority Data

Jul. 31, 2008 (JP) ................................. 2008-197941

(51) Int. Cl.
*G01Q 10/00* (2010.01)
(52) U.S. Cl.
USPC ............................................................ 850/1
(58) Field of Classification Search
USPC ............................................................ 850/1
See application file for complete search history.

(56) References Cited

U.S. PATENT DOCUMENTS

| | | | | |
|---|---|---|---|---|
| 5,081,353 A * | 1/1992 | Yamada et al. | ................... | 850/1 |
| 5,117,110 A * | 5/1992 | Yasutake | ........................... | 850/1 |
| 5,323,003 A * | 6/1994 | Shido et al. | ........................ | 850/1 |
| 5,825,670 A * | 10/1998 | Chernoff et al. | ................ | 702/85 |
| 6,353,219 B1 * | 3/2002 | Kley | ............................. | 250/234 |
| 6,392,229 B1 * | 5/2002 | Dana et al. | ...................... | 850/33 |
| 6,441,371 B1 * | 8/2002 | Ahn et al. | ......................... | 850/1 |
| 6,661,004 B2 * | 12/2003 | Aumond et al. | .............. | 250/306 |
| 6,960,765 B2 * | 11/2005 | Tomimatsu et al. | .............. | 850/1 |
| 7,020,329 B2 * | 3/2006 | Prempraneerach et al. | .. | 382/164 |
| 2002/0004905 A1 * | 1/2002 | Davis et al. | ..................... | 713/193 |
| 2002/0135755 A1 * | 9/2002 | Kley | ................................ | 356/72 |
| 2003/0004905 A1 * | 1/2003 | Reading et al. | ................. | 706/15 |
| 2004/0089816 A1 * | 5/2004 | Quake et al. | ................. | 250/458.1 |
| 2005/0117163 A1 * | 6/2005 | Ng et al. | ....................... | 356/501 |
| 2005/0285033 A1 * | 12/2005 | Takaoka et al. | ............... | 250/309 |
| 2006/0097162 A1 * | 5/2006 | Maruyama et al. | ........... | 250/309 |
| 2008/0000291 A1 * | 1/2008 | Masser | ........................... | 73/105 |
| 2008/0147346 A1 * | 6/2008 | Eby et al. | ........................ | 702/94 |
| 2010/0071477 A1 * | 3/2010 | Haehner et al. | ............. | 73/861.18 |
| 2010/0257641 A1 * | 10/2010 | Perkins et al. | .................... | 850/1 |

FOREIGN PATENT DOCUMENTS

| | | |
|---|---|---|
| JP | 03-257310 A | 11/1991 |
| JP | 04-058102 A | 2/1992 |
| JP | 06-201372 A | 7/1994 |
| JP | 09-203740 A | 8/1997 |

(Continued)

*Primary Examiner* — Robert Kim
*Assistant Examiner* — Jason McCormack
(74) *Attorney, Agent, or Firm* — Brinks Hofer Gilson & Lione (57) ABSTRACT

Provided is an aligning method capable of setting a sample observation unit such as an optical microscope to a probe microscope observation position at high precision. A sample having a known structure is used in advance. A surface of the sample and a shape of a cantilever provided with a probe are observed using the sample observation unit such as the optical microscope. A sample observation position and a probe position which are obtained using the sample observation unit are verified, and a relative positional relationship therebetween is recorded. Then, a first mark indicating a position of the cantilever and a second mark which is displayed in conjunction with the first mark and has the relative positional relationship with the first mark are produced to align the sample relative to the second mark.

12 Claims, 10 Drawing Sheets

FOREIGN PATENT DOCUMENTS

| | | |
|---|---|---|
| JP | 2909829 B | 6/1999 |
| JP | 3023686 B | 3/2000 |
| JP | 2003-028772 A | 1/2003 |
| JP | 2004-264039 A | 9/2004 |
| JP | 2006-023285 A | 1/2006 |
| JP | 2008-003035 A | 1/2008 |

* cited by examiner

PROBE ALIGNING METHOD FOR PROBE MICROSCOPE AND PROBE MICROSCOPE OPERATED BY THE SAME

RELATED APPLICATIONS

This application claims priority under 35 U.S.C. §119 to Japanese Patent Application No. JP2008-197941 filed on Jul. 31, 2008, the entire content of which is hereby incorporated by reference.

BACKGROUND OF THE INVENTION

1. Field of the Invention

The present invention relates to a method of aligning, with a sample measurement position, a probe of a probe microscope for measuring shape information such as surface roughness or a step of a sample surface, or physical information such as a dielectric constant or viscoelasticity, and a probe microscope operated by the same.

2. Description of the Related Art

In recent years, a probe microscope such as an atomic force microscope (AFM) having atomic resolution has been expected for shape measurement to evaluate a fine shape. The atomic force microscope which is a type of probe microscope has been expected as means for observing a surface shape of a novel insulating material, and investigations thereof have been conducted since the atomic force microscope was devised by G. Binnig (inventor of scanning tunneling microscope (STM)), et al.

An example of a schematic system structure of the probe microscope is described with reference to FIG. 6.

A sample 51 which is an object to be measured is placed on a fine movement mechanism 52 for three-dimensionally moving the sample. The fine movement mechanism 52 includes piezoelectric elements deformed in response to applied voltages, and finely aligns the sample 51 relative to a probe 53 opposed to the sample. The probe 53 is provided at a tip end of a beam member supported at only one end, which is called a cantilever 54.

Figure 7:
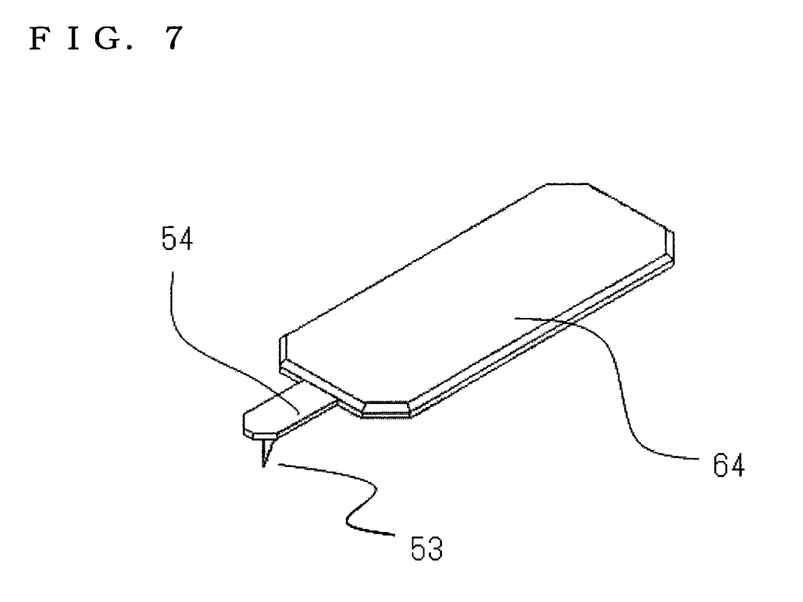
FIG. 7 is a structural view illustrating a normal cantilever shape.

FIG. 7 illustrates an example of a normal shape of the cantilever. A cantilever board 64 is provided with the cantilever 54 which is the beam member supported at only one end. The fine probe 53 is formed at the tip end of the cantilever 54 and has mainly a square pyramid shape with a height of 1 μm to 2 μm. The cantilever board 64, the cantilever 54, and the probe 53 are made of silicon or a silicon-based material and integrally formed using, for example, an anisotropic etching technique.

The cantilever board 64 including the cantilever 54 is held by a cantilever holder 55.

The fine movement mechanism 52 is located on a rough movement mechanism 56 including a stage for three-dimensionally moving the sample 51 and the probe 53. The rough movement mechanism 56 is a screw feed mechanism driven by a stepping motor.

A displacement detection system 57 for detecting a deformation of the cantilever based on a physical force such as an interatomic force, which the probe 53 receives from the surface of the sample, is provided on the cantilever 54 side. The displacement detection system 57 includes a semiconductor laser 58 for irradiating a rear surface of the cantilever 54 with light and a four-part photo detector 59 for detecting reflected light, and is a system called an optical lever detection system for detecting a displacement (distortion deformation) of the cantilever based on the fact that a position of the light incident on the photo detector is changed by the displacement of the cantilever 54.

A signal from the photo detector 59 is sent through an amplifier 60 to a Z-axis control feedback circuit 61 for controlling a Z-axis (vertical direction) interval between the sample 51 and the probe 53 to operate the fine movement mechanism 52, thereby controlling a Z-axis positional relationship between the probe 53 and the sample 51. In-plane scanning between the probe 53 and the sample 51 is performed by scanning with the fine movement mechanism based on a signal from an XY-driver circuit 62. The Z-axis control and the XY-driving are performed by a computer and a control system 63.

The probe 53 provided at the tip end of the cantilever 54 is brought close to the surface of the sample 51 by the rough movement mechanism 56. A deformation of the cantilever 54 resulting from a physical force such as an interatomic force, a magnetic force, or viscoelasticity, which the probe 53 receives from the surface of the sample 51, is detected by the displacement detection system 57. When the deformation becomes a predetermined deformation, it is determined that the probe 53 is aligned to a measurement region. Then, the rough movement mechanism 56 is stopped, and the Z-shaft of the fine movement mechanism 52 for relatively moving the sample 51 and the probe 53, which is located on the sample side or the cantilever side, is controlled to maintain an interval between the probe 53 and the surface of the sample 51. While the Z-shaft of the fine movement mechanism 52 is controlled, the rough movement mechanism 56 is driven to adjust a displacement amount of the Z-shaft of the fine movement mechanism 52, thereby aligning the probe 53 with the surface of the sample 51. The control is performed such that a deformation value of the cantilever 54 is maintained constant. The surface of the sample is measured during scanning using the fine movement mechanism 52, thereby visually imaging an in-plane shape of the sample and physical properties thereof.

Figure 8A:
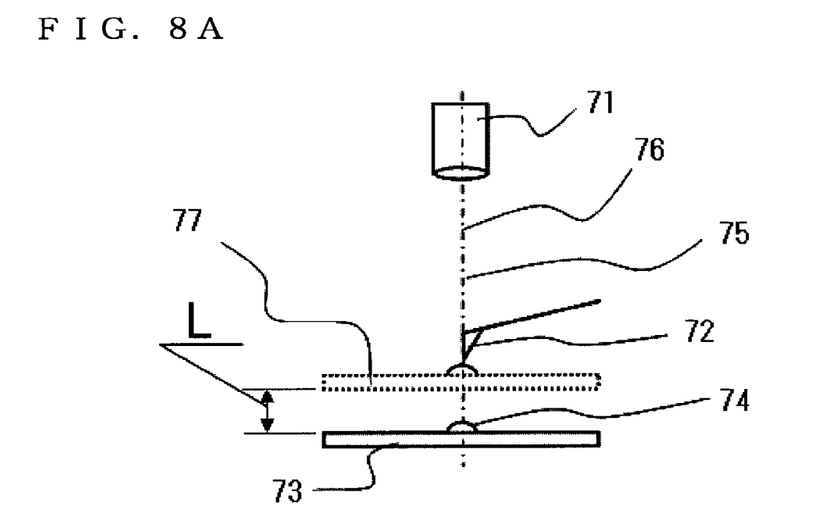
FIGS. 8A and 8B are explanatory diagrams illustrating alignment error generation states.
Figure 8B:
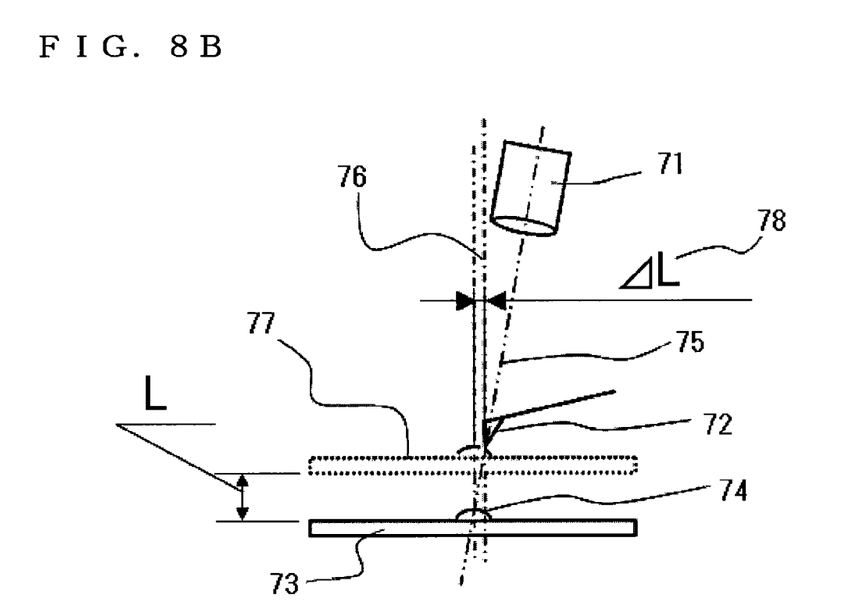

An optical microscope is normally used as means for designating a location to be measured using the probe microscope, and there are a method of observing a region between the cantilever and the sample in an oblique direction and a method of performing an overhead observation using an optical member such as a prism (see, for example, JP 3023686 B). In the case of the oblique observation, a depth state on an opposite side of the optical microscope is uncertain, and hence alignment precision is low. On the other hand, in the case of the overhead observation, the alignment is easy. In general, in the case of the overhead observation, the focus of the optical microscope is adjusted on the rear surface opposed to the surface of the cantilever, to which the probe is attached, thereby verifying a probe position. Then, the focus of the optical microscope is adjusted on the surface of the sample based on the verified position, thereby determining a position to be observed using the probe microscope. As illustrated in FIG. 8A, assume that an optical microscope 71, a probe 72, and an observation object 74 of a sample 73 are aligned with an optical path 75 and a moving path 76 of an alignment unit (rough movement mechanism) for aligning the sample and the probe with each other. In such a case, the probe 72 can be aligned with the observation object 74 at a close position 77 between the probe 72 and the sample 73 without any problems, and hence the observation object to be observed using the optical microscope 71 can be observed using the probe microscope. However, unless adjustment is performed, an apparatus structural displacement occurs because the optical microscope and the rough movement mechanism are different members. As illustrated in FIG. 8B, even in the case of the overhead observation, an error 78 occurs, and alignment precision may be low. The error may vary at a magnification related to a geometric relationship as an interval between the focal position of the optical microscope and the close position 77 becomes larger. When the probe is brought close to the sample to perform alignment, the error may become smaller. However, in this case, the optical microscope observes the rear surface of the cantilever, and hence there is no difference between the focal position for observing the cantilever and the focal position for observing the sample. Therefore, when the surface of the sample is to be observed, the shadow of the cantilever interferes therewith, whereby the surface of the sample cannot be observed.

A scanning region of the probe microscope is normally several tens micrometers in size. When the alignment precision is low, the position may be outside the scanning region of the probe microscope. In this case, the method is conceivable, in which the scanning region of the probe microscope is increased in size. However, in a case where a smaller object is to be observed, when the scanning region of the probe microscope is large in size, the resolution is reduced because a data acquisition interval is large. Therefore, it takes time to find the observation object.

An example of a combination with the optical microscope is a method of adjusting the sample observation position and the probe position using a moving mechanism such as a stage based on a known sample for each cantilever exchange in a case where the optical microscope is provided at a position different from that of the probe (see, for example, JP 2909829 B and JP 06-201372 A). There is also a method of correcting the probe position using the optical microscope provided at a position separate from that of the probe position of the probe microscope (see, for example, JP 09-203740 A and JP 04-058102 A). Such a method may have alignment precision. However, an apparatus becomes larger, and hence the method is not suitable for a small apparatus.

Therefore, a probe microscope capable of easily aligning a position to be observed has been desired.

SUMMARY OF THE INVENTION

The present invention has been made in order to solve the problems described above. Therefore, an object of the present invention is to provide a probe aligning method capable of easily aligning a probe microscope observation position on a sample surface with a probe provided at a tip end of a cantilever at high precision, and a probe microscope operated by the same.

According to the present invention, the following means is provided in order to solve the problems described above.

According to a probe microscope of the present invention, a sample having a known structure is used in advance. A surface of the sample and a shape of a cantilever provided with a probe are observed using sample observation means such as an optical microscope. A sample observation position and a probe position which are obtained using the sample observation means are verified, and a relative positional relationship therebetween is recorded. Then, a first mark indicating a position of the cantilever and a second mark which is displayed in conjunction with the first mark and has the relative positional relationship with the first mark are produced to align the sample relative to the second mark.

The sample having the known structure is used in advance. The cantilever and sample observation positions from the observation means when the sample observation position obtained using the sample observation means and the position of the probe provided in the cantilever are verified, and the difference between the cantilever and sample observation positions from the observation means at the time of the operation of the probe microscope observation are geometrically corrected. The sample alignment is performed using mark displayed during the sample observation, to align the probe with the sample observation position.

The observation means for observing the surface of the sample and the shape of the cantilever, such as the optical microscope is prepared. The sample having the known structure is used in advance. The relative position between the sample observation position obtained using the sample observation means such as the optical microscope and the position of the probe provided in the cantilever is corrected to obtain the mark. When the observation object position on the sample is determined using the mark, an alignment error resulting from an apparatus structure can be reduced and the observation position can be determined with high precision using a relatively simple structure based on software operation.

Therefore, the observation using the optical microscope and the highly precise alignment within the probe microscope observation region can be achieved, and hence it is possible to provide a probe microscope with which the reliability of a result obtained by measurement is improved.

DETAILED DESCRIPTION OF THE PREFERRED EMBODIMENTS

Hereinafter, a probe microscope according to a first embodiment of the present invention is described with reference to FIGS. 1 and 2A to 2F. In the following embodiment, the description of fundamentally the same structure as the schematic system structure of the probe microscope as illustrated in FIG. 6 is omitted here.

Figure 1:
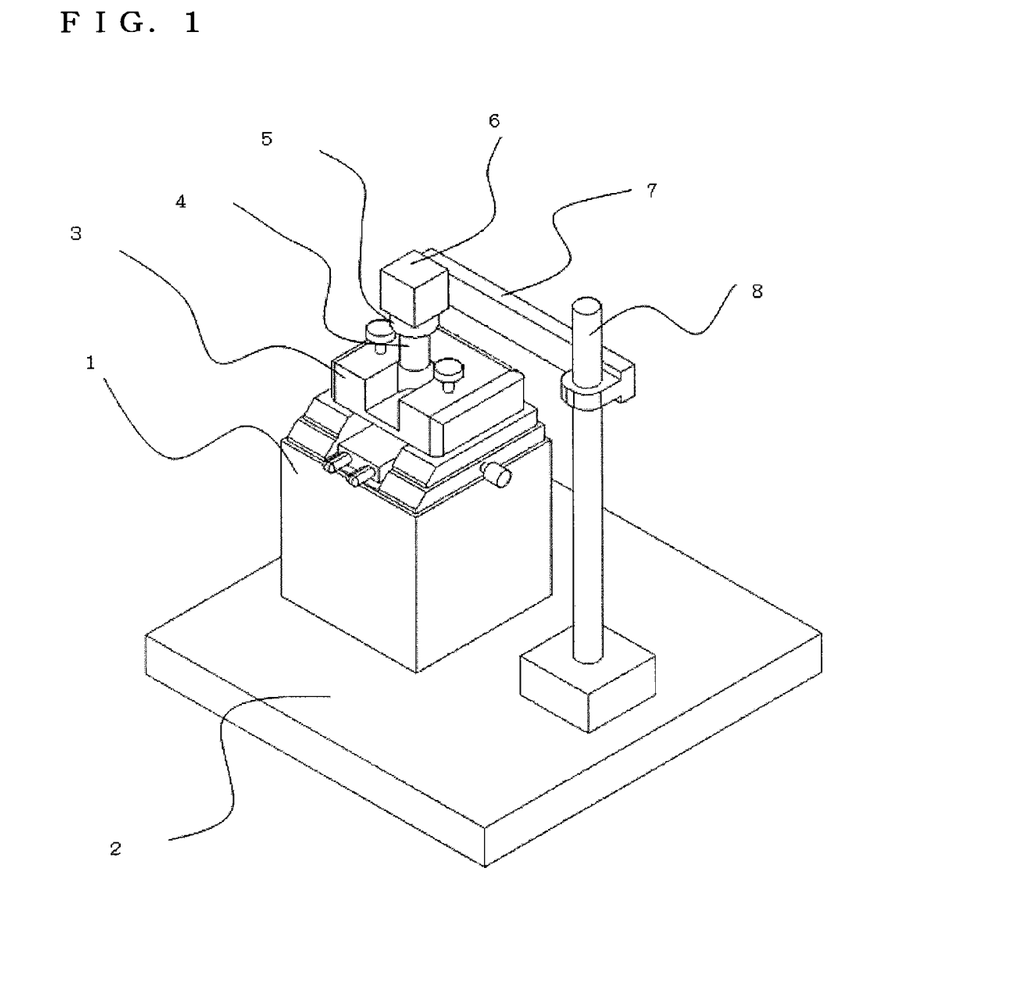
FIG. 1 is a structural view illustrating an outline of a probe microscope according to a first embodiment of the present invention.

FIG. 1 is a structural view illustrating the probe microscope according to the first embodiment of the present invention.

Figure 6:
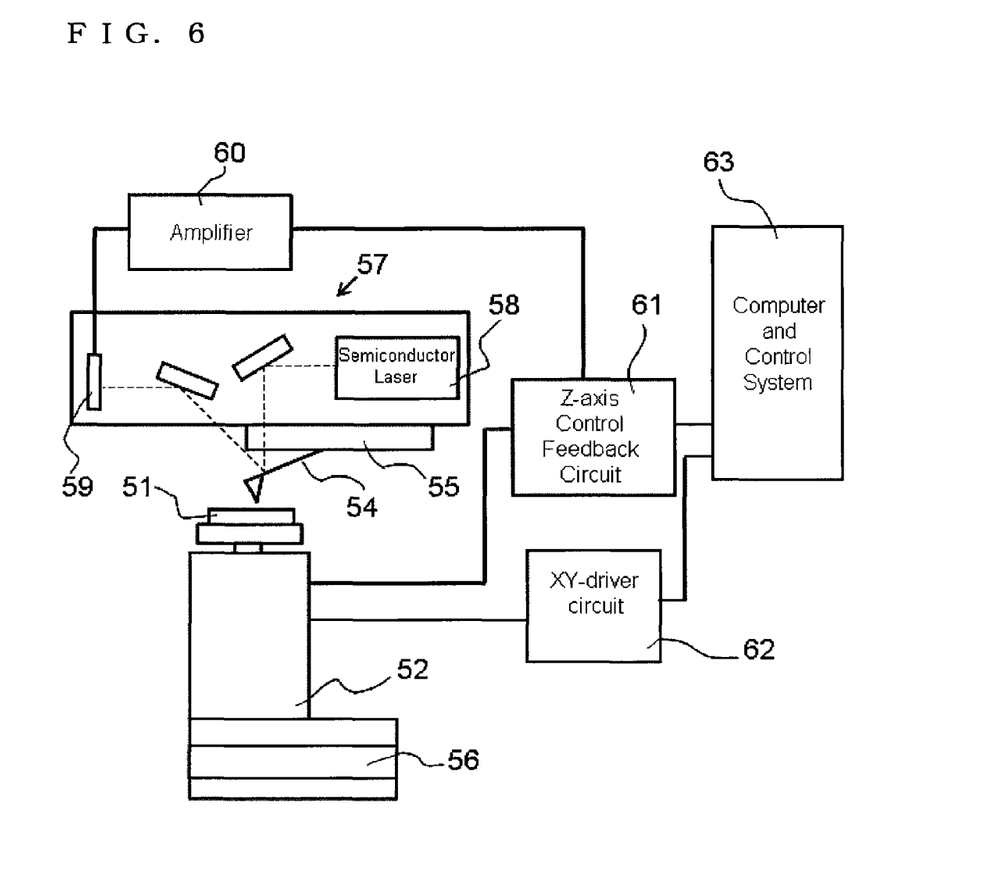
FIG. 6 is a structural diagram illustrating a schematic system of a probe microscope.

A probe microscope unit 1 as described with reference to FIG. 6 is provided on a vibration isolation table surface plate 2. An optical head 3 having a function of detecting a displacement of a cantilever based on an optical lever system is provided in an upper portion of the probe microscope unit 1. An optical microscope 4 and a CCD camera 6 are located above the optical head 3 and provided on the vibration isolation table surface plate 2 through an arm 7 and a pole 8. An observation image showing a surface of a sample and the cantilever is sent as an optical microscope image to a computer through the CCD camera, digital-processed by the computer, and displayed on a display. Rough focal adjustment is performed by moving the arm 7 upward or downward relative to the pole 8. Fine focal adjustment between the surface of the cantilever and the surface of the sample is performed by manual operation of a focal adjustment ring 5 of the optical microscope 4.

Next, an error specific to an apparatus between an optical path of the optical microscope and a moving path of an alignment unit (rough movement mechanism) for aligning the sample and a probe with each other is calculated in the following manner.

Figure 2A:
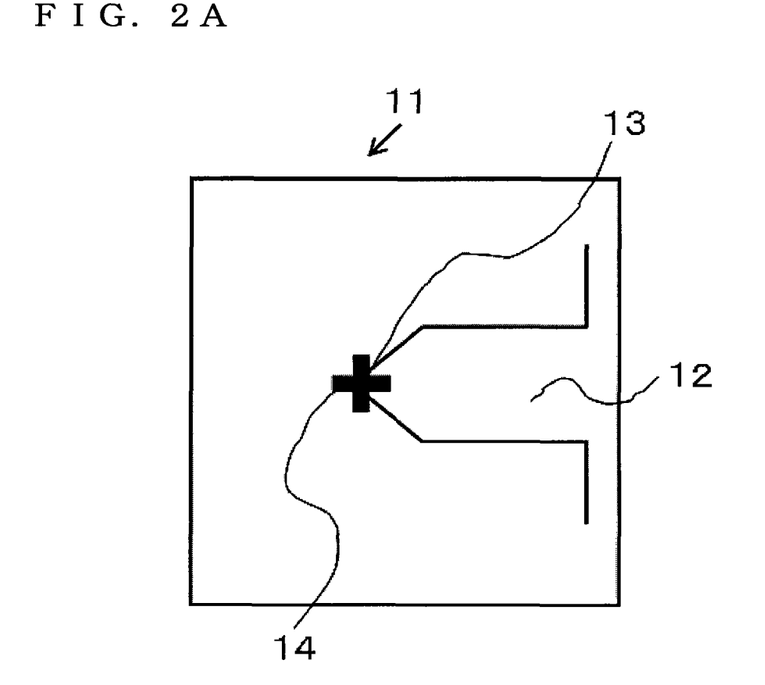
FIGS. 2A to 2F are explanatory state diagrams illustrating an operation in the first embodiment of the present invention.
Figure 2B:
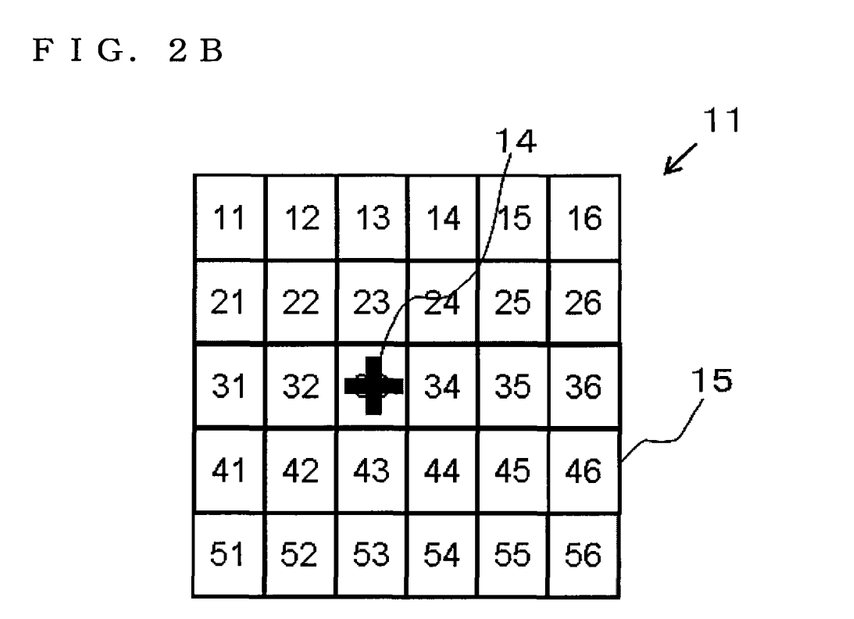
Figure 2C:
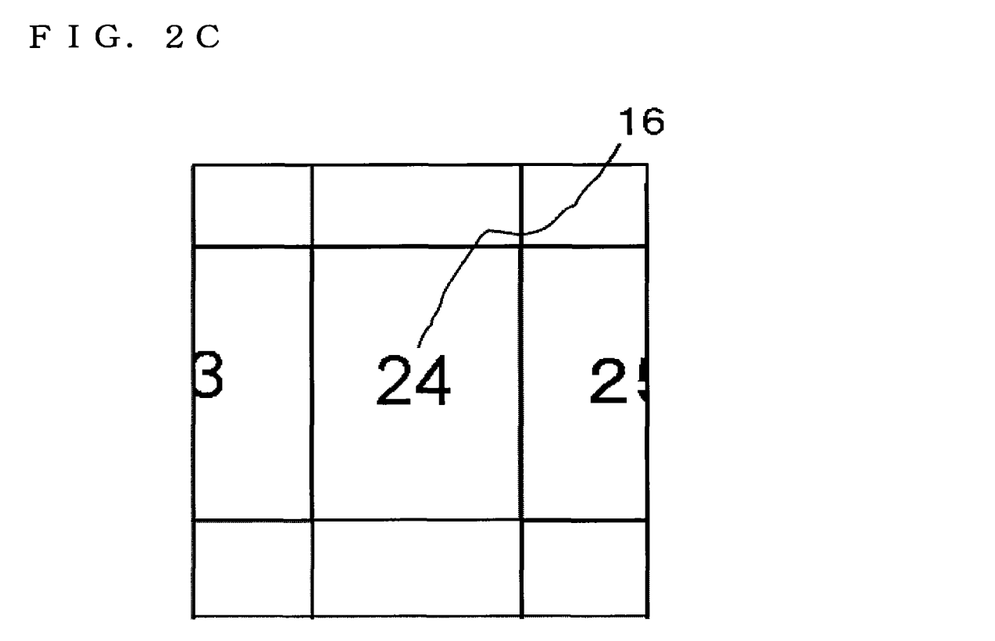
Figure 2D:
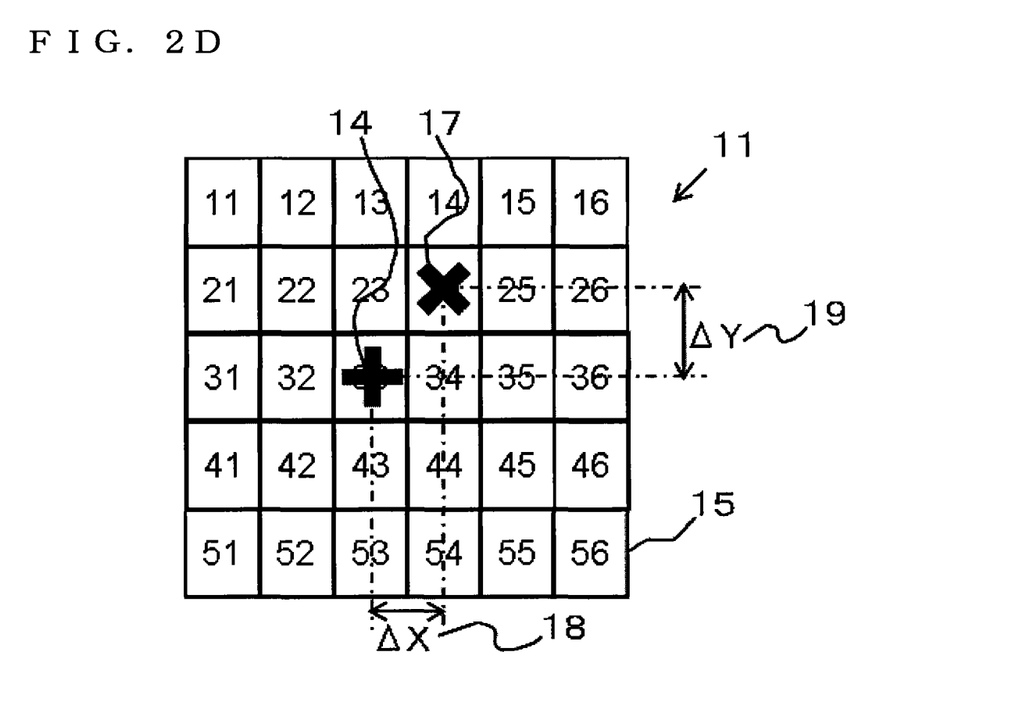

1. A sample having a known structure is prepared. In this embodiment, a structural pattern which has numerals drawn at a pitch of 10 micrometers and is made of silicon is used.
2. The cantilever is set in the apparatus. In this embodiment, a cantilever which is provided with the probe formed at a tip end portion of the cantilever and is made of silicon is used.
3. The focus of the optical microscope is adjusted to the cantilever to display an optical microscope image having a relatively large observation view region.
4. As illustrated in FIG. 2A, A cross mark 14 is placed as a first mark indicating a probe position in a position of a probe 13 provided at a tip end of a cantilever 12, which is displayed on a CCD image 11 (determination of probe position). The cross mark 14 is overwritten on the CCD image 11 and thus left on the display even when the focus of the optical microscope is shifted.
5. The focus is adjusted to the surface of the sample.
6. As illustrated in FIG. 2B, the cross mark 14 is aligned with an arbitrary observation position on a pattern sample 15. A pattern located at the center position on the CCD image 11 is normally selected.
7. The probe is brought close to the surface of the sample to perform a probe microscope observation. For example, an image as illustrated in FIG. 2C is obtained as a result obtained by measurement.
8. As illustrated in FIG. 2D, an X mark 17 is placed as a second mark on the CCD image 11 based on a result obtained by observing a pattern numeral 16 illustrated in FIG. 2C by the probe microscope (determination of position at which probe microscope observation is actually performed). Differences 18 and 19 between the cross mark 14 and the X mark 17 correspond to the error specific to the apparatus between the optical path of the optical microscope and the moving path of the alignment unit (rough movement mechanism) for aligning the sample and the probe with each other. A relative positional relationship is determined so as to move the cross mark 14 and the X mark 17 together and stored in a storage unit included in the apparatus (determination and storage of relative positional relationship in large observation region).

The operation described above is performed to complete the determination of the relative positional relationship in the large observation region, which corresponds to the error specific to the apparatus. The value is specific to the apparatus, and hence unless the structure of the apparatus is changed, it is unnecessary to perform the operation even in a case where the cantilever is exchanged for another. In the example described above, the sample having the known structure is used. A sample to be measured can be directly used. The sample having the known structure is preferably used because the observation position is easily determined.

Next, second and subsequent normal measurement operations are described.

Figure 2E:
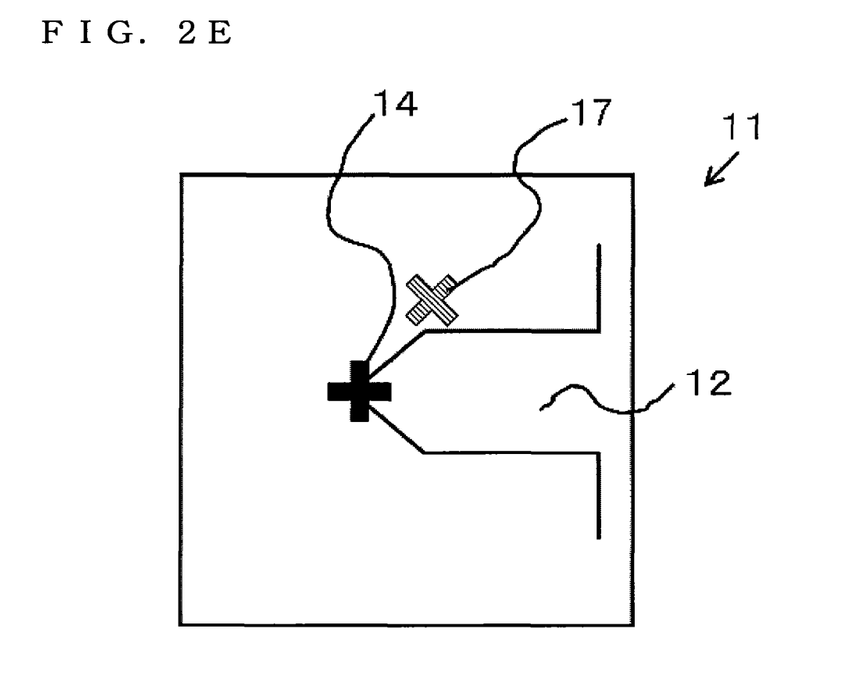

1. A sample is set.
2. The cantilever is set in the apparatus.
3. The focus of the optical microscope is adjusted to the cantilever to display an optical microscope image.
4. A first mark is placed in a probe position (probe position at time of observation). As illustrated in FIG. 2E, the cross mark 14 and the X mark 17 which is moved together therewith (position at which probe microscope observation is assumed to be actually performed, based on probe position at time of observation and stored result obtained by determination of relative positional relationship in large observation region) are put.

In consideration of the visibility of sample observation in the case where the two marks are displayed on a screen, whether or not the X mark 17 is displayed on the screen is switched by software operation.

Figure 2F:
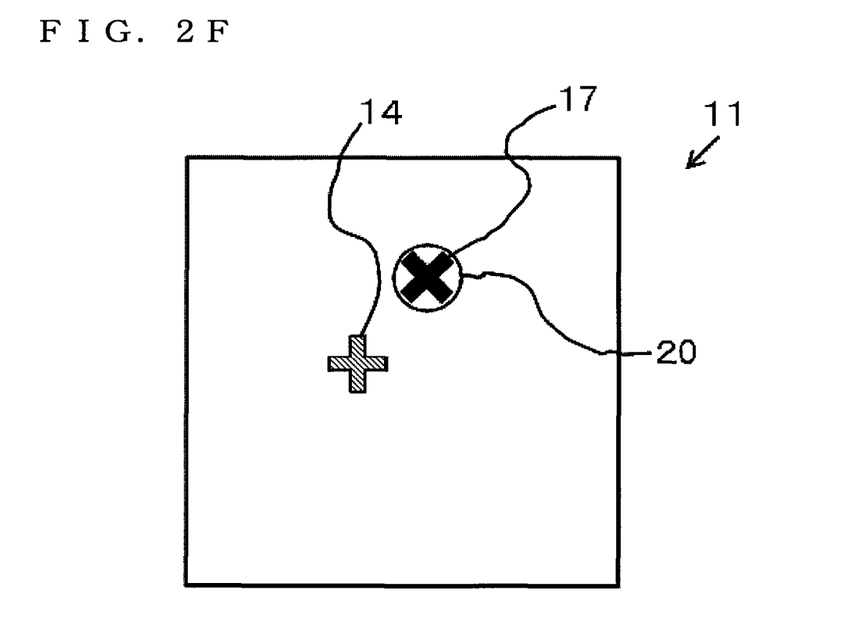

5. The focus is adjusted to the surface of the sample.
6. As illustrated in FIG. 2F, the X mark 17 is displayed.

The cross mark 14 and the X mark 17 are moved together, and hence different mark shapes are used in this embodiment in order to distinguish the marks from each other. Different colors may be used. When the focus or magnification of the optical microscope which is an observation unit is adjusted for sample observation, the mark for the probe position may be removed. This is more preferable because the false recognition of a mark for alignment is eliminated to perform more reliable alignment.

7. The X mark 17 is assumed to be located at an actual probe position, and aligned with an observation position 20 of the sample.
8. The probe is brought close to the surface of the sample to perform the probe microscope observation.

The operation as described above is performed for each cantilever exchange. When only the sample is exchanged for another, the sample observation position may be determined using the X mark 17.

A second embodiment of the present invention is described with reference to FIGS. 3A and 3B. A fundamental procedure is identical to that of the first embodiment.

Figure 3A:
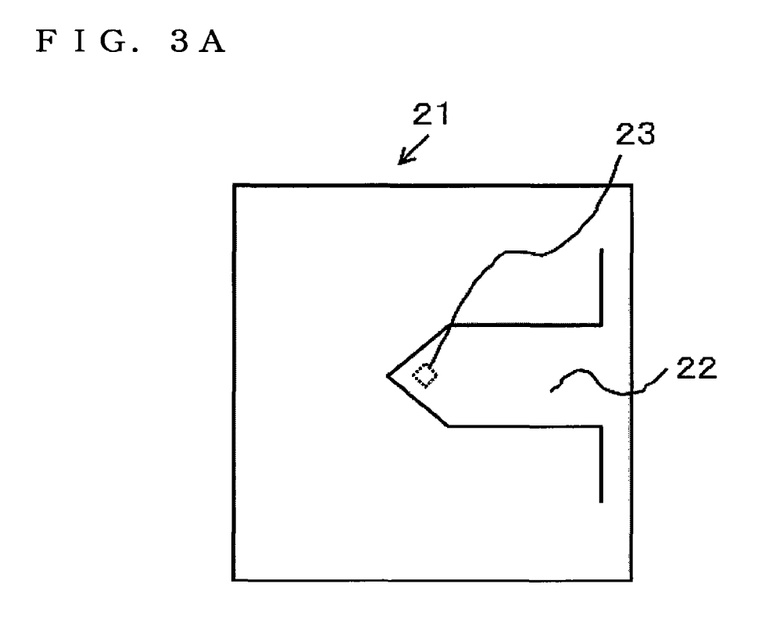
FIGS. 3A and 3B are explanatory state diagrams illustrating an operation in a second embodiment of the present invention.
Figure 3B:
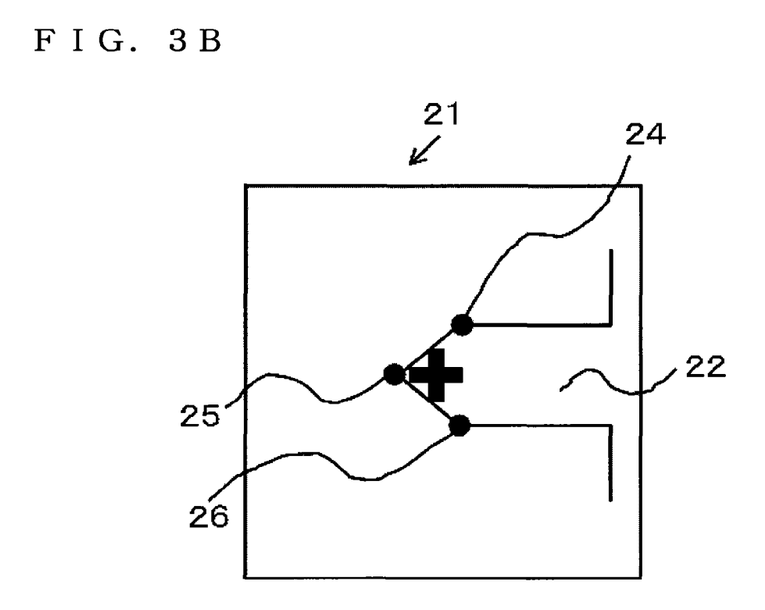

As illustrated in FIG. 3A, when a probe 23 is not provided at a tip end of a cantilever 22 displayed on a CCD screen 21, a mark is imaginatively placed. This causes an error. Therefore, in the second embodiment, when the probe position is to be specified, three points 24, 25, and 26 on an outline of the cantilever 22 are designated. The probe position is determined based on cantilever design information. Thus, an error caused by the designation of an operator, of the position of the probe provided not at the tip end of the cantilever but inside the cantilever can be reduced, with the result that the sample observation position can be determined.

In a third embodiment, when the probe position is to be specified, the outline of the cantilever is determined by image recognition software. The probe position is determined based on cantilever design information. An image recognition function is added to the system, and hence a cost thereof increases. However, the error caused by the designation of the operator can be reduced, with the result that the sample observation position can be more accurately determined.

Figure 4:
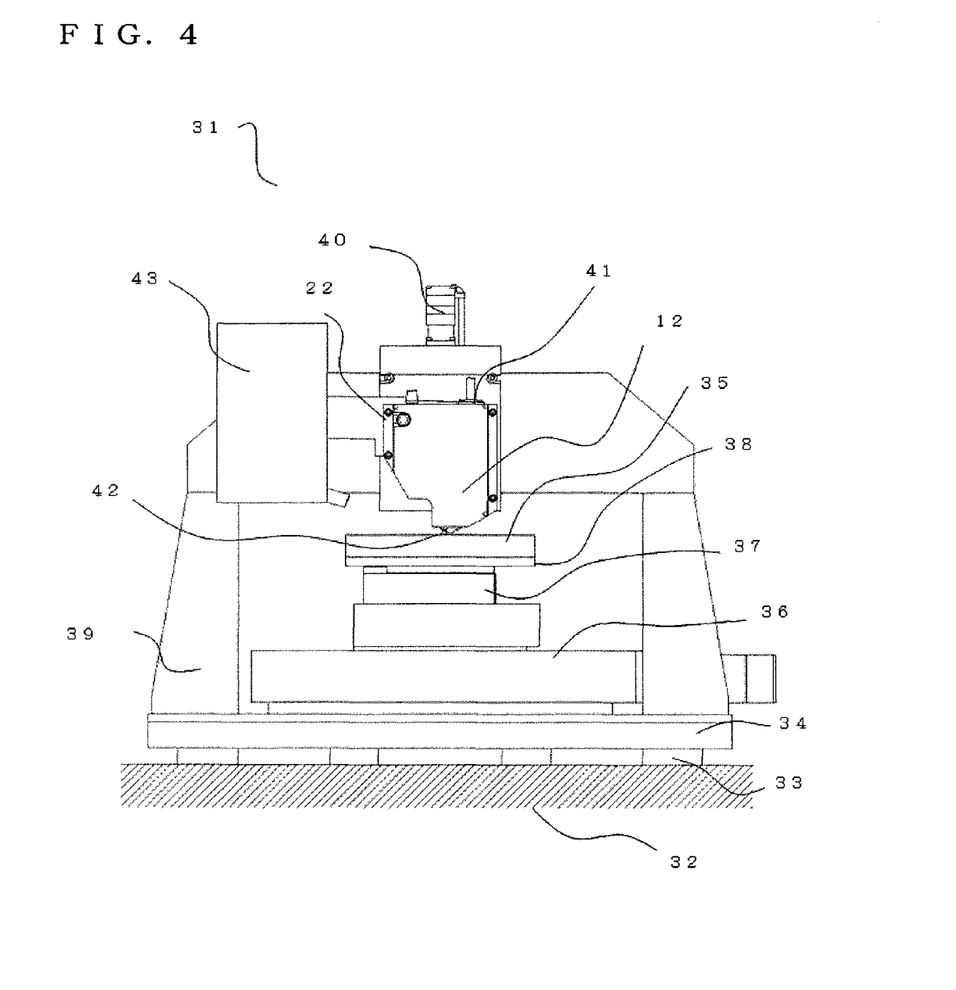
FIG. 4 is a structural view illustrating an outline of a probe microscope according to a fourth embodiment of the present invention.

In a fourth embodiment, an apparatus structure in which the present invention is used for a probe microscope for observing a large sample such as a wafer is described with reference to FIG. 4.

A unit section 31 is provided over a vibration isolation table surface plate 32. The vibration isolation table includes a passive type or an active type. The active type is effective in a case where a low-frequency contains vibration component. The unit section 31 is located on a base 34 over the vibration isolation table surface plate 32 through elastic materials 33. An XY-stage, which is a rough alignment mechanism 36 for aligning a sample 35 in an in-plane direction, is provided over the base 34. A sample in-plane rotating stage 37 is provided over the rough alignment mechanism 36 to hold the sample 35 through a sample table 38. An arm 39 is provided on the base 34. A Z-axis stage 40, which is a vertical direction alignment mechanism, is fixed to the arm 39, and a fine movement mechanism 41, which is a fine alignment mechanism, is provided thereto through the Z-axis stage 40. The fine movement mechanism 41 includes piezoelectric elements finely distorted in response to applied voltages. A cantilever 42 is fixed to a tip end of the fine movement mechanism 41. In the apparatus according to this embodiment, a fixing method with vacuum suction is used. The probe provided at a tip end of the cantilever 42 is aligned with a surface of the sample 35 by the Z-axis stage 40. Distortion deformation of the cantilever 42 is detected by an optical lever mechanism (not shown) provided in the fine movement mechanism 41, to measure the shape of the surface of the sample. In this embodiment, an optical microscope unit 43 is provided. A mirror is provided close to the cantilever 42 located at the tip end of the fine movement mechanism 41, whereby the surfaces of the cantilever 42 and the sample 35 can be observed through the mirror.

Figure 5A:
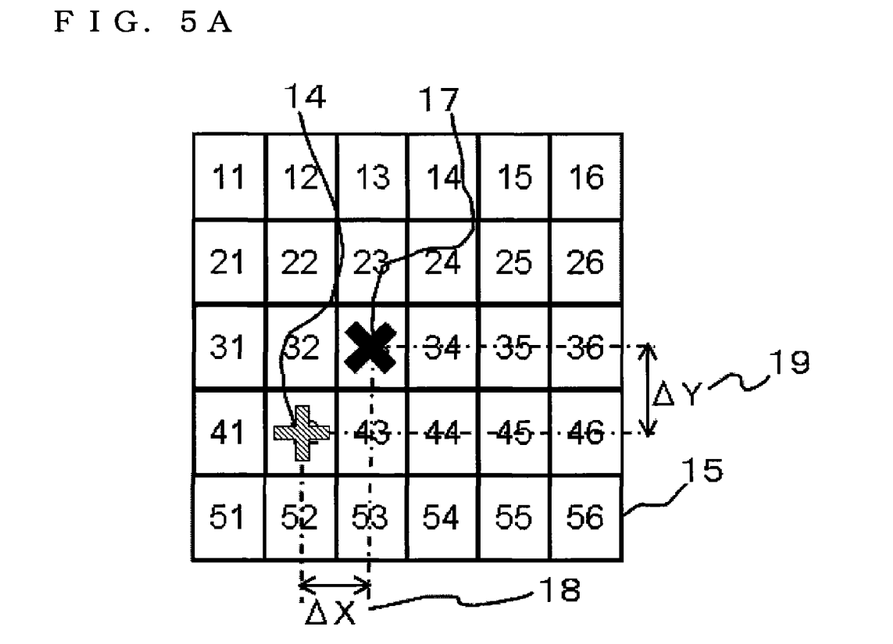
FIGS. 5A and 5B are explanatory state diagrams illustrating marking states in the fourth embodiment of the present invention.
Figure 5B:
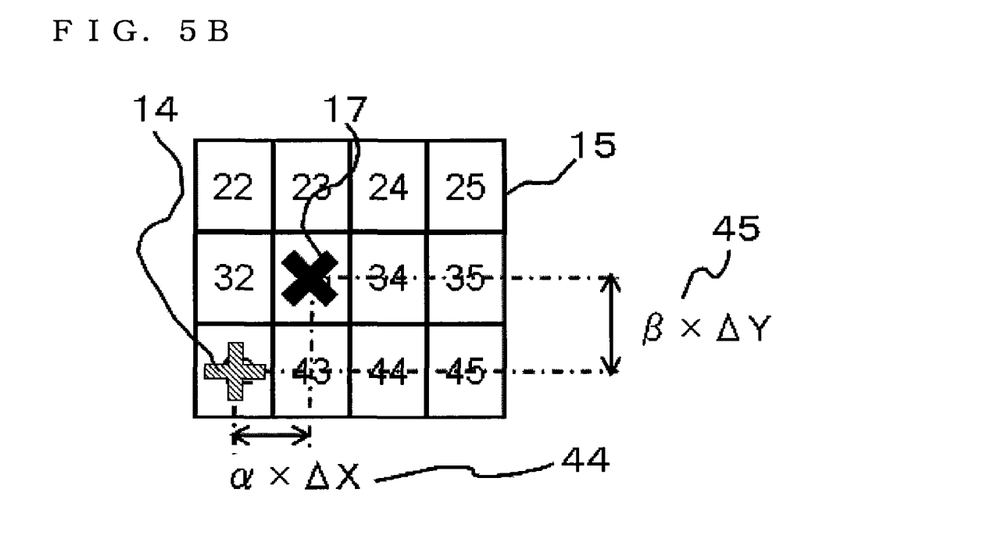

The optical microscope unit 43 includes the CCD camera, a zoom mechanism for changing magnification, and a focal adjustment mechanism. The apparatus according to this embodiment has a system in which the focus and magnification of the optical microscope can be adjusted by a computer and from the outside. The focus and the magnification can be adjusted from the outside, and hence the relative positional relationship between the probe position in the large observation view region which is determined at the time of first observation and the actual probe microscope observation position can be corrected based on an error caused by a thickness of the used sample and a change of the observation view region (high-magnification observation) of the observation unit. Specifically, the X mark 17 assumed to be located at the probe position at the time of second or subsequent observation is displayed by taking geometric correction such as a proportional distribution into account using computer and external control values based on, as a reference, a value determined at the time of first observation. For example, correction relationships 44 and 45 as illustrated in FIGS. 5A and 5B are taken into account. Correction values are values specific to the apparatus. As in the case where the relative positional relationship between the above-mentioned probe position and the actual probe microscope observation position is determined, when the sample having the known shape is used, the correction values can be easily set.

What is claimed is:

1. A probe aligning method for a probe microscope comprising:
   a cantilever including a probe provided at a tip end thereof;
   a rough movement mechanism and a fine movement mechanism which are provided to control a distance between the cantilever and a sample;
   observation means for observing a surface of the sample and a position of the probe provided at the tip end of the cantilever; and
   a moving mechanism for relatively moving the sample and the probe,
   the probe being brought one of close to and into contact with the surface of the sample to measure one of shape information and physical information of the surface of the sample, to thereby align the probe with an arbitrary observation position of the sample, the probe aligning method comprising:
   determining, by the observation means, position of the probe provided at the tip end of the cantilever over the surface of the sample to perform marking;
   moving the probe from the position over the surface of the sample to an actual observation position that is one of close to and into contact with the surface of the sample to perform probe microscope observation;
   determining the actual observation position;
   determining, in a first observation view region, a relative positional relationship specific to the probe microscope between the position of the probe above the surface of the sample and the actual observation position;
   storing a determination result of the probe microscope-specific relative positional relationship in the first observation view region, which is determined at a time of first observation; and
   aligning, for observation operations corresponding to subsequent samples, an observation position of the subsequent samples with a position at which the probe microscope observation is assumed to be actually performed, based on the position of the probe at a time of observation and the stored determination result of the probe microscope-specific relative positional relationship in the first observation view region when subsequently aligning the probe with the observation position of the subsequent sample, wherein the aligning comprises:
   determining, in a second observation view region that is smaller than the first observation view region, a probe microscope-specific relative positional relationship between the position of the probe and the actual observation position at which the probe microscope observation is performed, based on respective points observed by the observation means during the probe microscope observation, and storing the probe microscope-specific relative positional relationship;
   determining a geometric correction value corresponding to an observation view region size based on a difference between the determination result of the probe microscope-specific relative positional relationship in the first observation view region and a determination result of the probe microscope-specific relative positional relationship in the second observation view region; and
   correcting position information of the actual observation position at which the probe microscope observation is performed, based on the geometric correction value.

2. A probe aligning method for a probe microscope according to claim 1, wherein, when the probe microscope-specific relative positional relationship in the first observation view region, which is determined at the time of the first observation is obtained by observation using a sample having a known structure, the position of the probe and the actual observation position of the probe microscope are read.

3. A probe aligning method for a probe microscope according to claim 1, wherein when the position of the probe of the cantilever is to be marked, an outline of the cantilever is selected by the observation means and the position of the probe is marked based on design shape information of the cantilever.

4. A probe aligning method for a probe microscope according to claim 3, wherein the outline of the cantilever is selected by selecting at least three vertexes of the outline of the cantilever and the position of the probe is marked based on the design shape information of the cantilever.

5. A probe aligning method for a probe microscope according to claim 1, wherein, when the position of the probe of the cantilever is to be marked, information from the observation means is subjected to image recognition and the position of the probe is marked based on design shape information of the cantilever.

6. A probe aligning method for a probe microscope according to claim 1, further comprising:
 displaying, when subsequently aligning the probe with the observation position of the sample, only the position at which the probe microscope observation is assumed to be actually performed, based on the position of the probe at the time of the observation and the stored determination result of the probe microscope-specific relative positional relationship in the first observation view region; and
 avoiding displaying the position of the probe at the time of the observation.

7. A probe microscope configured to perform the probe aligning method of claim 1, the probe microscope comprising:
 a cantilever including a probe provided at a tip end thereof;
 a rough movement mechanism and a fine movement mechanism which are provided to control a distance between the cantilever and a sample;
 observation means for observing a surface of the sample and a position of the probe provided at the tip end of the cantilever; and
 a moving mechanism for relatively moving the sample and the probe,
 the probe being brought one of close to and into contact with the surface of the sample to measure one of shape information and physical information of the surface of the sample, to thereby align the probe with an arbitrary observation position of the sample.

8. A probe aligning method for a probe microscope according to claim 1, wherein, when the probe microscope-specific relative positional relationship in the first observation view region, which is determined at the time of the first observation is obtained by observation using a sample having a known structure, the position of the probe and the actual observation position of the probe microscope are easily read.

9. A probe aligning method for a probe microscope according to claim 1, wherein when the position of the probe of the cantilever is to be marked, an outline of the cantilever is selected by the observation means and the position of the probe is marked based on design shape information of the cantilever.

10. A probe aligning method for a probe microscope according to claim 9, wherein the outline of the cantilever is selected by selecting at least three vertexes of the outline of the cantilever and the position of the probe is marked based on the design shape information of the cantilever.

11. A probe aligning method for a probe microscope according to claim 1, wherein, when the position of the probe of the cantilever is to be marked, information from the observation means is subjected to image recognition and the position of the probe is marked based on design shape information of the cantilever.

12. A probe aligning method for a probe microscope according to claim 1, further comprising:
 displaying, when subsequently aligning the probe with the observation position of the sample, only the position at which the probe microscope observation is assumed to be actually performed, based on the position of the probe at the time of the observation and the stored determination result of the probe microscope-specific relative positional relationship in the first observation view region; and
 avoiding displaying the position of the probe at the time of the observation.

* * * * *